United States Patent
Dubrulle

(10) Patent No.: US 10,640,200 B2
(45) Date of Patent: May 5, 2020

(54) AIRCRAFT LANDING GEAR ASSEMBLY

(71) Applicant: Safran Landing Systems UK LTD, Gloucester (GB)

(72) Inventor: Yoann Dubrulle, Gloucester (GB)

(73) Assignee: Safran Landing Systems UK Ltd., Gloucester (GB)

( * ) Notice: Subject to any disclaimer, the term of this patent is extended or adjusted under 35 U.S.C. 154(b) by 468 days.

(21) Appl. No.: 15/661,160

(22) Filed: Jul. 27, 2017

(65) Prior Publication Data
US 2018/0037316 A1  Feb. 8, 2018

(30) Foreign Application Priority Data
Aug. 5, 2016 (EP) ..................................... 16183104

(51) Int. Cl.
*B64C 25/42* (2006.01)
*B64C 25/34* (2006.01)
*B64C 25/50* (2006.01)

(52) U.S. Cl.
CPC .............. *B64C 25/42* (2013.01); *B64C 25/34* (2013.01); *B64C 25/50* (2013.01); *B64C 2025/345* (2013.01)

(58) Field of Classification Search
CPC ......... B64C 25/42; B64C 25/34; B64C 25/50; B64C 25/00; B64C 2025/345
See application file for complete search history.

(56) References Cited

U.S. PATENT DOCUMENTS

| | | | | |
|---|---|---|---|---|
| 4,296,897 A | * | 10/1981 | Thompson | B60T 11/34 188/181 T |
| 5,595,359 A | * | 1/1997 | Meneghetti | B64C 25/50 244/103 R |
| 6,123,292 A | * | 9/2000 | Ralph | B64C 25/34 244/103 R |
| 6,149,100 A | | 11/2000 | Ralph | |
| 6,241,052 B1 | | 6/2001 | Berwanger | |
| 6,354,537 B1 | * | 3/2002 | Ralph | B64C 25/34 244/102 R |
| 2014/0084108 A1 | | 3/2014 | Goodburn | |

FOREIGN PATENT DOCUMENTS

| | | |
|---|---|---|
| EP | 0713826 A1 | 5/1996 |
| FR | 2812613 A1 | 2/2002 |

OTHER PUBLICATIONS

European Search Report for European Application No. 16183104. 5-1754, dated Nov. 24, 2016—7 Pages.

* cited by examiner

*Primary Examiner* — Philip J Bonzell
*Assistant Examiner* — Tye William Abell
(74) *Attorney, Agent, or Firm* — RatnerPrestia

(57) ABSTRACT

An aircraft landing gear assembly having: a bogie beam coupled to a strut; a steerable axle mounted on the bogie beam, first and second wheel assemblies, mounted on the axle, each wheel assembly including a wheel and a brake disc attached to each wheel and arranged to rotate with the wheel; first and second brake plates mounted on the axle arranged to provide a braking force to the wheels upon contact with the first and second brake discs; a cross member coupled between the first and second brake plates; a brake rod, pivotally connected to the cross member at a first end and arranged to be attached to an anchor point on the aircraft landing gear at a second end; wherein the pivot axis of the axle and the pivot axis of the cross member are generally coaxial.

11 Claims, 4 Drawing Sheets

AIRCRAFT LANDING GEAR ASSEMBLY

This application claims the benefit of and priority to European Application 16183104.5, filed on Aug. 5, 2016, the contents of which are incorporated herein by reference.

FIELD OF THE INVENTION

The invention relates to an aircraft landing gear assembly having a steerable bogie beam and a brake assembly.

BACKGROUND

Multi-axle aircraft landing gear typically include a main strut pivotally coupled to a bogie beam which carries the plurality of axles. Each axle can carry a pair of wheel and brake assemblies, one on either side of the bogie beam. A brake rod is provided for each brake assembly to couple each brake assembly to an anchor point on the landing gear, such as the main strut or bogie beam. Torque applied to elements of the brake during braking is reacted by the brake rods in a tensile or compressive manner. This reaction prevents the brake assemblies from co-rotating with the wheel when the brake is engaged. Brake rods are used in preference to mechanical fixing in order to overcome the known problem of a pitching moment being induced on the bogie beam during braking.

In some landing gears, particularly for larger aircraft, it is known for one axle to be pivotally coupled to the bogie beam so as to be steerable. However, in this case, the arrangement of the brake rods can limit the steering angle of the axle, as at large steering angles a brake rod can contact a wheel or a tyre.

SUMMARY

According to a first aspect of the invention, there is provided an aircraft landing gear assembly comprising:
  a main strut,
  a bogie beam coupled to a lower end region of the main strut,
  a steerable axle pivotally coupled to the bogie beam so as to define an axle pivot axis,
  first and second wheel assemblies mounted on the axle on opposite sides of the bogie beam, each wheel assembly comprising a wheel and a brake disc attached to the wheel and arranged to rotate with the wheel;
  first and second brake plates mounted on the axle and being displaceable towards and away from the brake discs to provide a braking force to the wheels upon contact with the first and second brake discs;
  a cross member coupled between the first and second brake plates, the cross member being distinct from the steerable axle;
  a brake rod having a first end region pivotally coupled to the cross member so as to define a cross member pivot axis and a second end region arranged to be attached to an anchor point on the aircraft landing gear;
  wherein the axle pivot axis and the cross member pivot axis member are generally coaxial.

This arrangement enables just a single brake rod to be used, which can be located centrally, spaced from the steerable axle, above or below the bogie beam, so that the steering angle of the steerable axle is not limited by the brake rod. This enables a greater range of steering angles in comparison to known, multi brake rod arrangement, while still enabling brake torque to be reacted by a brake rod. It will be understood that in practical circumstances the pivot axis of the cross member may have a small amount of offset or flexibility with respect to the pivot axis of the axle.

In some embodiments, the brake rod can be coupled to the cross member by a ball joint.

Using a ball joint attachment allows the brake rod to move independently of the steerable axle movement, so that the brake torque can be effectively transmitted to the slider fork at any angle of the axle, without inducing high torsional load at the attachment between the brake rod and the anchor point.

The cross member and the brake rod can be externally mounted with respect to the bogie beam and the steerable axle.

Thus, the cross member and the brake rod are parts of the landing gear additional to and separate from the bogie beam and/or the steerable axle and can be retrofitted to existing aircraft landing gears. In addition, this ensures that the cross member, the brake rod and their respective attachments are easy to service.

The aircraft landing gear assembly may include only a single brake rod for a particular pair of wheel assemblies. i.e. two wheel assemblies mounted on the same axle.

The first and second brake plates may be rigidly coupled to the cross member; for example by splines to inhibit relative rotation between the brake plates and the cross member.

This is advantageous as if one of the brakes fails and therefore is not generating any torque (for example, due to a flat tyre), the torque from the working brake will still be transmitted to the brake rod, since the cross member will remain parallel to the steerable axle. The system remains balanced in this situation as the torque due to rotation of the cross member caused by the torque from the working brake will simply be transmitted to the failed brake.

The brake rod may be arranged to be pivotally attached to the anchor point, for example by a pivot pin.

According to a second aspect of the invention there is provided a method of forming an aircraft landing gear assembly according to the first aspect, comprising the steps of: providing a landing gear assembly comprising: a main strut, a bogie beam coupled to a lower end region of the strut, a steerable axle pivotally coupled to the bogie beam, first and second wheel assemblies, mounted on the axle on opposite sides of the bogie beam, each wheel assembly comprising a wheel and a brake disc attached to the wheel and arranged to rotate with the wheel; first and second brake plates mounted on the axle and being displaceable towards and away from the brake discs to provide a braking force to the wheels upon contact with the first and second brake discs; coupling a cross member between the first and second brake plates; pivotally coupling a first end region of a brake rod to the cross member and coupling a second end region of the brake rod to an anchor point on the aircraft landing gear such that the pivot axis of the axle and the pivot axis of the cross member are generally coaxial.

BRIEF DESCRIPTION OF THE DRAWINGS

Embodiments of the invention will now be described with reference to the accompanying drawings, in which:

FIG. 2a is a schematic diagram of an attachment between the brake rod and the cross member of FIG. 1a;

FIG. 2b is a schematic diagram of a cross section through the attachment between the brake rod and the cross member of FIG. 2a;

FIG. 3 is a schematic diagram of an attachment between the brake rod and the slider fork of FIG. 1a;

FIG. 4 is a schematic diagram of an attachment between the cross member and one of the brake plates of FIG. 1a; and FIG. 5 is a schematic diagram of a method of forming the aircraft landing gear assembly of FIG. 1a.

DETAILED DESCRIPTION

Figure 1A:
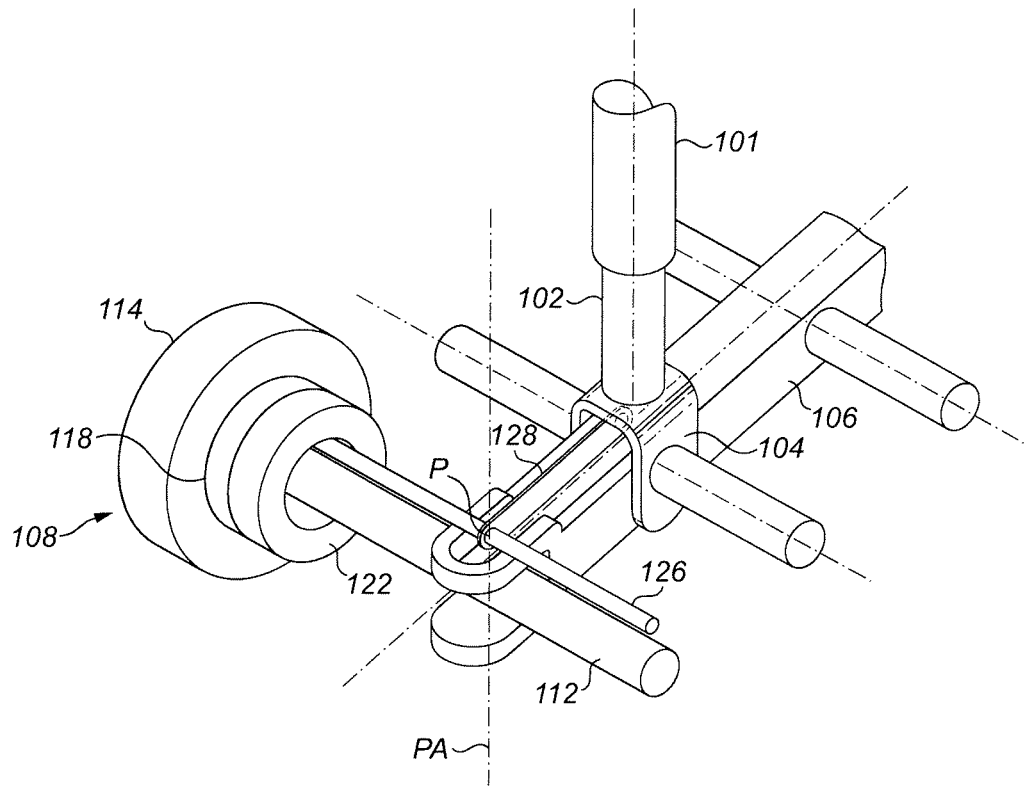
FIGS. 1a and 1b are, respectively schematic perspective and side view diagrams of an aircraft landing gear assembly according to an embodiment of the invention.

In FIG. 1a, an aircraft landing gear assembly is shown generally at 100. The aircraft landing gear assembly comprises a main strut 102, which can be a lower telescoping portion of a shock strut 101, known in the art as a 'slider' or 'sliding tube'. The slider 102 has a slider fork 104, the slider fork 104 being pivotally attached to a bogie beam 106. First and second wheel assemblies 108 (only one of which is illustrated) are mounted on the bogie beam 106 by a steerable axle 112 which is steerable about a pivot axis PA. The wheel assemblies 108 each include a wheel 114 and a brake disc 118 which is rigidly coupled to the wheel 114 such that the brake disc 118 rotates as the wheel 114 rotates.

Brake plates 122 are mounted on the axle 112 and are free to rotate about the axis A1 of the axle 112. A cross member 126 is coupled between the first and second brake plates. The cross member can therefore rotate around the axis of the axle 112 as the first and second brake plates 122 rotate. The cross member 126 is preferably arranged parallel to the steerable axle 112.

Figure 1B:
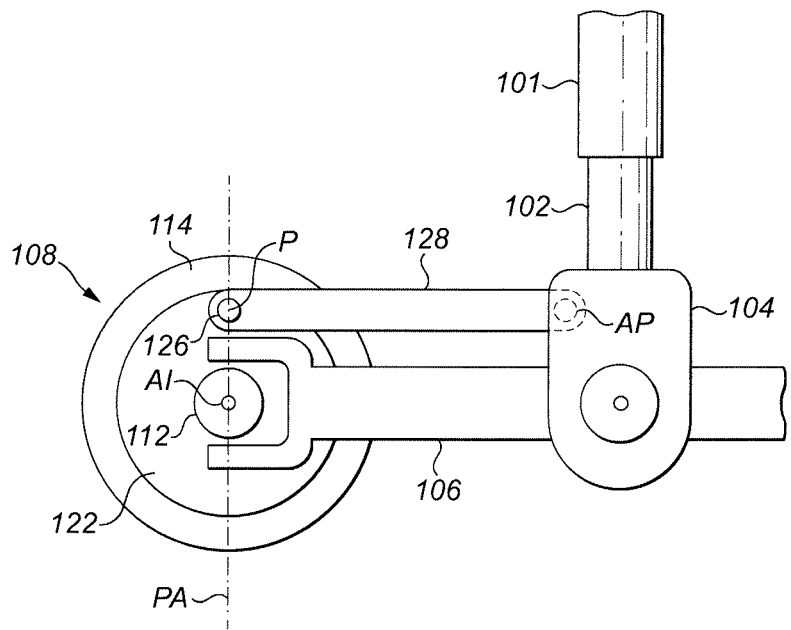

In the embodiment shown in FIG. 1, the brake plates 122 are coupled to the cross member 126 using a splined shaft. However, in some embodiments the brake plates 122 may be coupled to the cross member 126 using any other suitable attachments. The attachments between the brake plates 122 and the cross member 126 are arranged to inhibit relative rotation between the brake plates 122 and the cross member 126. The cross member 126 can be formed from any suitable material; for example, titanium.

In the embodiment shown in FIG. 1, the cross member 126 is formed from a tubular section. Forming the cross member 126 from a tubular section is advantageous as this reduces the weight of the cross member 126, which is mainly working in torsion and bending.

A first end of a brake rod 128 is pivotally attached to the cross member 126 at a point P on the cross member 126 that is generally equally spaced between the brake plates 122. Thus, the cross member 126 can pivot relative to the brake rod 128 about a cross member pivot axis which is coaxial with the axle pivot axis PA. In the embodiment shown in FIG. 1, the brake rod 128 is attached to the cross member by a ball joint. However, in some embodiments the brake rod 128 may be attached to the cross member 126 by an alternative type of pivotal connection, for example a Cardan joint.

The brake rod 128 can be installed above or below the bogie beam 106. Preferably the brake rod 128 is installed above the bogie beam 106 as the brake assembly is less prone to damage in this arrangement, which in turn reduces the need for protective surface treatment and leads to a reduction in weight and a reduction in part replacement rate. In embodiments where the brake rod 128 is installed below the bogie beam 106, the ground clearance required between the brake rod 128 and the ground is the same as the ground clearance required for known systems with known brake rod assemblies.

The brake rod 128 can be formed from an "I" section bar. Forming the brake rod 128 from an "I" section is advantageous as this reduces the weight of the brake rod, which is mainly working in compression and tension. The brake rod 128 can be formed from any suitable material; for example, titanium.

A second end of the brake rod 128, opposite to the first end, is pivotally attached to an anchor point AP on the landing gear. In the embodiment shown in FIG. 1, the anchor point AP is located on the slider fork 104. However, in some embodiments the anchor point AP may be located elsewhere on the landing gear. In the embodiment shown in FIG. 1, the brake rod 128 is attached to the anchor point AP by a pivot pin attachment. However, in some embodiments, other suitable attachments may be used. In some embodiments, where the bogie beam 106 is not arranged to pivot, the brake rod 128 may be rigidly attached to the anchor point AP.

Figure 2A:
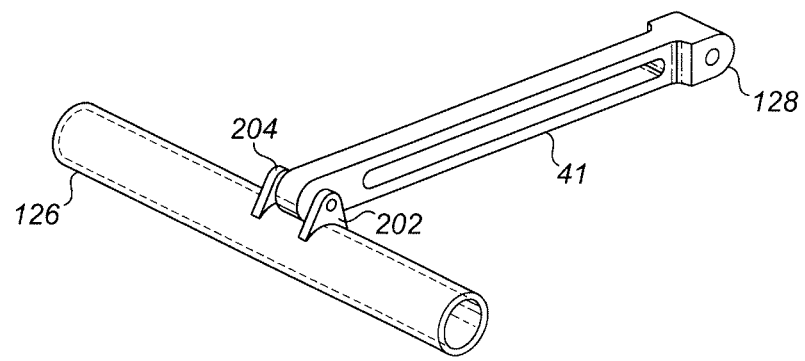
Figure 2B:
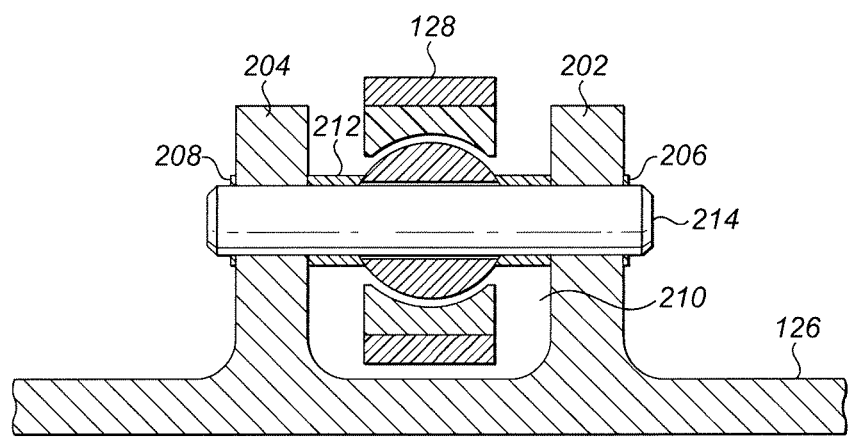

An attachment between the brake rod 128 and the cross member 126 is shown in FIGS. 2a and 2b. The attachment comprises first and second lugs 202, 204 which are integrally formed as part of the cross member 126. Each of the first and second lugs 202, 204 has a mounting bore 206, 208. A first end of the brake rod comprises a ball joint 210. A bore 212 is formed through the ball of the ball joint 210 which is aligned with the mounting bores 206, 208 formed in the first and second lugs 202, 204. A pin 214 passes through the first and second mounting bores 206, 208 and the bore 212 to attach the brake rod 128 to the cross member 126. It will be appreciated that other types of attachments could alternatively be used to couple together the brake rod and the cross member 126.

Figure 3:
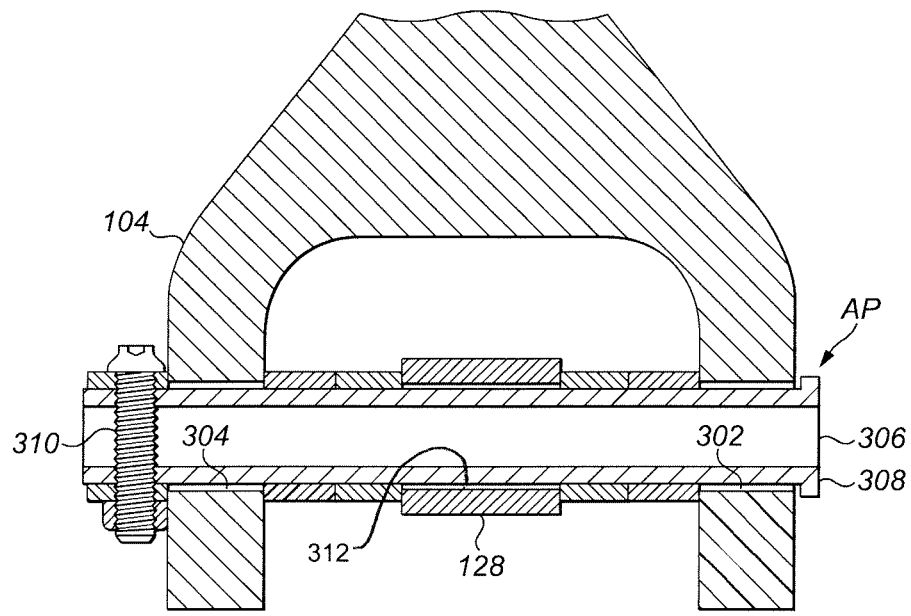

An attachment between the brake rod 128 and an anchor point AP on the slider fork 104 is shown in FIG. 3. Two bores 302, 304 are formed through the slider fork 104, through which passes a pin 306. The brake rod 128 comprises a bore 312 and the pin 306 passes through the bore 312. The pin has a wider cross section 308 at a first end which is wider than and projects out of the bore 312. At a second end, the pin 306 is held in place in the bore by a bolt 310 that passes transversely through the pin and extends out of the pin at both ends of the bolt 310. It will be appreciated that other types of attachments could alternatively be used to couple together the brake rod and the cross member.

Figure 4:
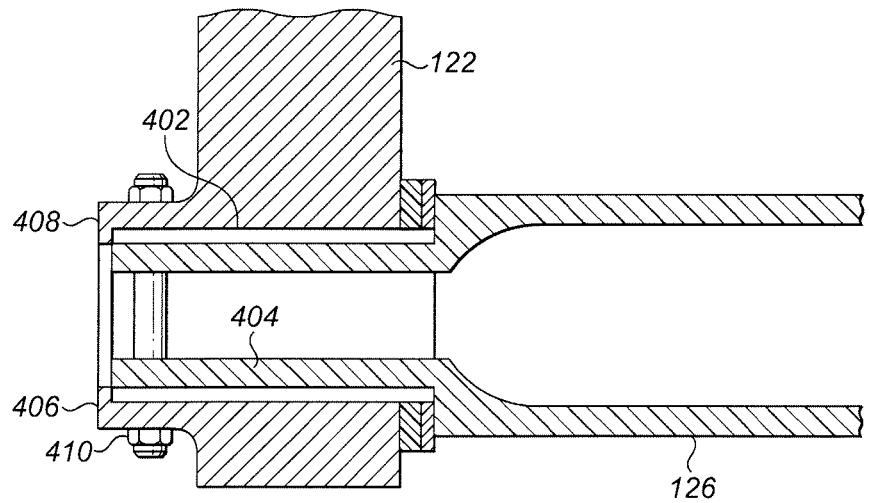

An attachment between one of the brake plates 122 and a first end of the cross member 126 is shown in FIG. 4. The brake plate 122 has a bore 402 with longitudinal grooves formed on the inside surface of the bore 402 to define splines. The cross member 126 is provided with a splined shaft 404 that extends into the brake plate bore 402, the splines corresponding to the grooves in the brake plate bore 402 such that torque is transmitted between the brake plate 122 and the cross member 126. The brake plate 122 also has two integrally formed projections 406, 408 and the cross member 126 is attached to the brake plate 124 by a bolt 410 passing through these projections 406, 408 and through the cross member. The second brake plate 124 is attached to a second end of the cross member 126 in the same manner. It will be appreciated that in some embodiments other types of attachment between the brake plates 122, 124 and the cross member could be used.

In use, when the brake plates 122 contact the brake disc 118, brake torque is transmitted to the brake discs 118 by the brake plates 122. This causes an attempted rotation of the cross member 126 around the axis of the axle 112. This attempted rotation is reacted by the anchored brake rod 128 acting in a compressive manner.

As the bogie beam 106 pivots about the pivotal connection to the slider fork 104, so too does the brake rod 128. The brake rod 128 therefore applies a force to the cross member 126 that causes the brake plates 122 and the cross member 126 to rotate about the axis of the axle 112 and causes the brake rod 128 to pivot at the pivotal connection to the anchor point AP in the same direction as the bogie beam 106.

In some embodiments the bogie beam may have two steerable axles. In this case, each steerable axle may support a pair of brake plates connected together with a cross member coupled between the first and second brake plates, with a brake rod, pivotally connected to the cross member at a first end and arranged to be attached to an anchor point on the aircraft landing gear at a second end wherein the pivot axis of the axle and the pivot axis of the cross member are coaxial.

Figure 5:
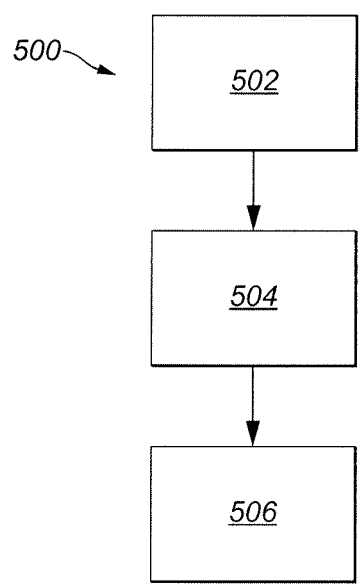

The central brake rod 128 and cross member 126 can be applied to new landing gear and can also be easily retrofitted to existing landing gear. Thus, embodiments of the invention relate to a method of forming an aircraft landing gear, as shown in FIG. 5. The method 500 comprises the steps of: 502 providing a landing gear assembly comprising: a main strut, a bogie beam coupled to a lower end region of the strut, a steerable axle pivotally coupled to the bogie beam, first and second wheel assemblies, mounted on the axle on opposite sides of the bogie beam, each wheel assembly comprising a wheel and a brake disc attached to the wheel and arranged to rotate with the wheel; first and second brake plates mounted on the axle and being displaceable towards and away from the brake discs to provide a braking force to the wheels upon contact with the first and second brake discs; 504 coupling a cross member between the first and second brake plates; and 506 pivotally coupling a first end region of a brake rod to the cross member and coupling a second end region of the brake rod to an anchor point on the aircraft landing gear such that the pivot axis of the axle and the pivot axis of the cross member are generally coaxial.

Although the invention has been described above with reference to one or more preferred embodiments, it will be appreciated that various changes or modifications may be made without departing from the scope of the invention as defined in the appended claims. The word "comprising" can mean "including" or "consisting of" and therefore does not exclude the presence of elements or steps other than those listed in any claim or the specification as a whole. The mere fact that certain measures are recited in mutually different dependent claims does not indicate that a combination of these measures cannot be used to advantage.

The invention claimed is:

1. An aircraft landing gear assembly comprising:
a main strut;
a bogie beam coupled to a lower end region of the main strut;
a steerable axle pivotally coupled to the bogie beam, so as to define an axle pivot axis;
first and second wheel assemblies, mounted on the axle on opposite sides of the bogie beam, each wheel assembly comprising a respective wheel and a respective brake disc attached to the respective wheel and arranged to rotate with the respective wheel;
first and second brake plates mounted on the axle, each of the first and second brake plates being displaceable towards and away from a respective one of the brake discs to provide a braking force to the wheels upon contact with the first and second brake discs;
a cross member coupled between the first and second brake plates, the cross member being distinct from the steerable axle;
a brake rod having a first end region pivotally coupled to the cross member so as to define a cross member pivot axis, and a second end region arranged to be attached to an anchor point on the aircraft landing gear;
wherein the axle pivot axis and the cross member pivot axis are substantially coaxial.

2. The aircraft landing gear assembly according to claim 1, wherein the brake rod is attached to the cross member by a ball joint.

3. The aircraft landing gear assembly according to claim 1, wherein the cross member and the brake rod are spaced apart from the bogie beam and the steerable axle.

4. The aircraft landing gear assembly according to claim 1, wherein the brake rod is attached to the cross member at a point equally spaced between the first and second brake plates.

5. The aircraft landing gear assembly according to claim 1, wherein the aircraft landing gear assembly includes a single brake rod.

6. The aircraft landing gear assembly according to claim 1, wherein the first and second brake plates are rigidly coupled to the cross member.

7. The aircraft landing gear assembly according to claim 1, wherein the brake rod is arranged to be pivotally attached to the anchor point.

8. The aircraft landing gear assembly according to claim 1, wherein the cross member is coupled between the first and second brake plates such that brake torque is transmitted from the first and second brake plates to the cross member.

9. The aircraft landing gear assembly according to claim 1, wherein the cross member is parallel to and distinct from the axle.

10. An aircraft including one or more aircraft landing gear assemblies according to claim 1.

11. A method of forming an aircraft landing gear assembly, the method comprising:
providing a landing gear assembly comprising:
a main strut,
a bogie beam coupled to a lower end region of the main strut,
a steerable axle pivotally coupled to the bogie beam,
first and second wheel assemblies, mounted on the axle on opposite sides of the bogie beam, each wheel assembly comprising a respective wheel and a respective brake disc attached to the respective wheel and arranged to rotate with the respective wheel, and
first and second brake plates mounted on the axle and being displaceable towards and away from the brake discs to provide a braking force to the wheels upon contact with the first and second brake discs;
coupling a cross member between the first and second brake plates, the cross member being distinct from the steerable axle; and
pivotally coupling a first end region of a brake rod to the cross member and coupling a second end region of the brake rod to an anchor point on the aircraft landing gear such that the pivot axis of the axle and the pivot axis of the cross member are substantially coaxial.

* * * * *